United States Patent
Magisson et al.

(10) Patent No.: US 9,873,449 B2
(45) Date of Patent: Jan. 23, 2018

(54) COMPUTER PROGRAM AND METHOD FOR CONTROLLING A DRIVE SYSTEM OF AN AGRICULTURAL VEHICLE

(71) Applicant: AGCO Corporation, Hesston, KS (US)

(72) Inventors: Emmanuel Regis Magisson, Newton, KS (US); Robert A. Matousek, Valley Center, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 15/102,052

(22) PCT Filed: Dec. 5, 2014

(86) PCT No.: PCT/US2014/068718
§ 371 (c)(1),
(2) Date: Jun. 6, 2016

(87) PCT Pub. No.: WO2015/085134
PCT Pub. Date: Jun. 11, 2015

(65) Prior Publication Data
US 2016/0304116 A1    Oct. 20, 2016

Related U.S. Application Data

(60) Provisional application No. 61/912,466, filed on Dec. 5, 2013.

(51) Int. Cl.
| | |
|---|---|
| *B62D 11/06* | (2006.01) |
| *B62D 5/04* | (2006.01) |
| *B60K 17/356* | (2006.01) |
| *B62D 11/00* | (2006.01) |
| *B62D 11/24* | (2006.01) |
| *G01S 19/13* | (2010.01) |

(52) U.S. Cl.
CPC .............. *B62D 5/04* (2013.01); *B60K 17/356* (2013.01); *B62D 11/003* (2013.01); *B62D 11/06* (2013.01); *B62D 11/24* (2013.01); *G01S 19/13* (2013.01)

(58) Field of Classification Search
CPC ........ B62D 5/04; B62D 11/003; B62D 11/06; B62D 11/24; B60K 17/356
See application file for complete search history.

(56) References Cited

U.S. PATENT DOCUMENTS

| | | | |
|---|---|---|---|
| 7,172,046 B2 * | 2/2007 | Ho ..................... | A01D 41/1274 180/197 |
| 7,357,214 B2 * | 4/2008 | Ho ..................... | A01D 41/1274 180/242 |
| 7,921,626 B2 * | 4/2011 | Maertens ............. | A01D 41/127 56/10.2 G |
| 2010/0307843 A1 | 12/2010 | Lawson, Jr. | |

OTHER PUBLICATIONS

European Patent Office, International Search Report for International Patent Application No. PCT/US2014/068718, dated Feb. 19, 2015.

* cited by examiner

*Primary Examiner* — Michael J Zanelli

(57) ABSTRACT

A computer program and method for controlling a drive system of a harvester or other agricultural vehicle. The computer program calculates an inner motor displacement reduction of an inner motor of the drive system and a pump displacement reduction of a variable displacement pump of the drive system. By reducing the pump displacement in addition to the inner motor displacement, a speed of the harvester is maintained while turning.

13 Claims, 2 Drawing Sheets

Figure 1:
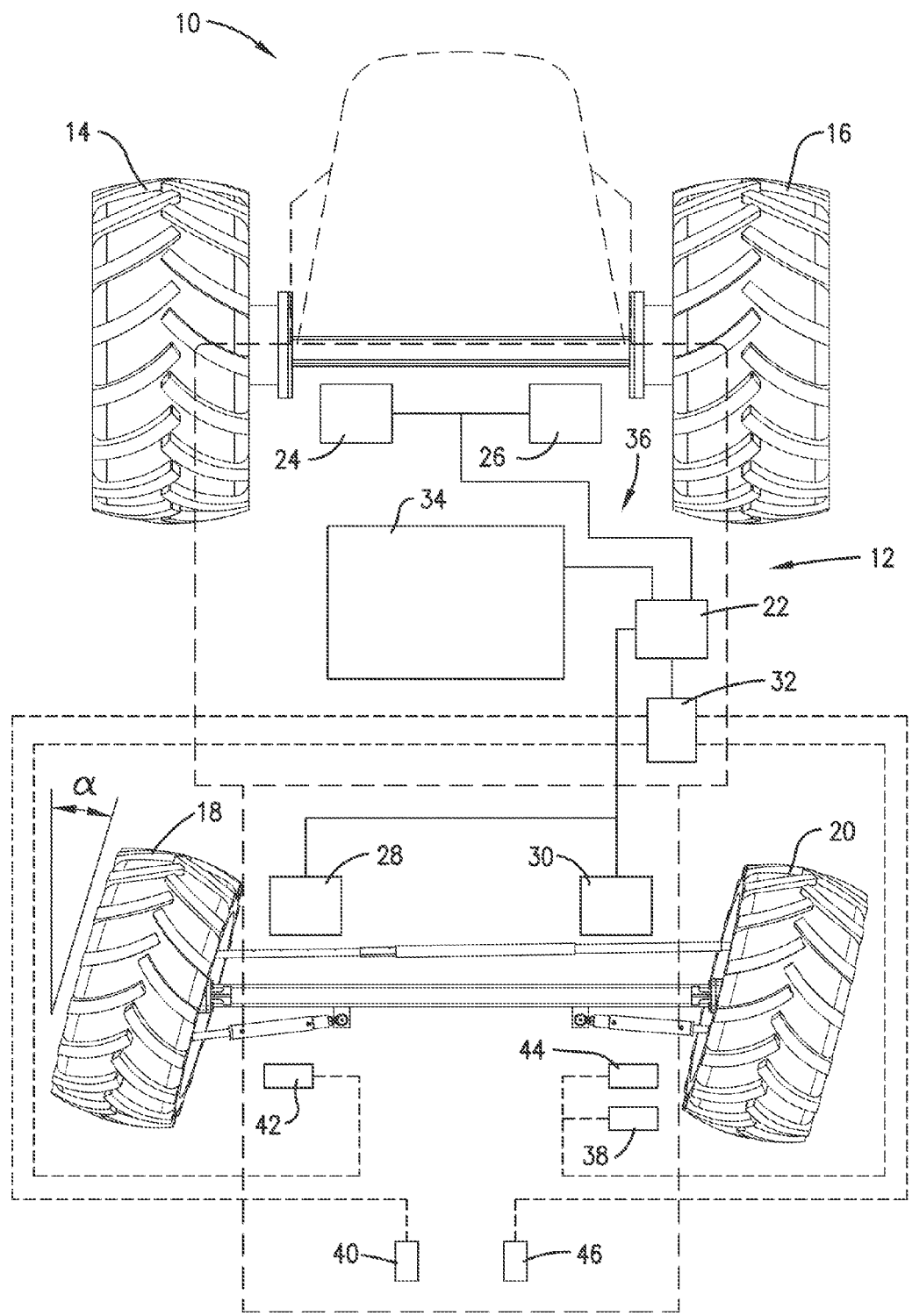

COMPUTER PROGRAM AND METHOD FOR CONTROLLING A DRIVE SYSTEM OF AN AGRICULTURAL VEHICLE

CROSS REFERENCE TO RELATED APPLICATION

This application claims the benefit of U.S. Provisional Application No. 61/912,466, entitled COMPUTER PROGRAM AND METHOD FOR CONTROLLING A DRIVE SYSTEM OF AN AGRICULTURAL VEHICLE, filed Dec. 5, 2013, which is hereby incorporated by reference in its entirety.

BACKGROUND OF THE INVENTION

Field of Invention

This invention relates to drive systems for agricultural vehicles such as harvesters.

Description of Related Art

Harvesters are large and heavy and therefore difficult to turn. A conventional harvester includes powered non-steering front wheels and non-powered rear steering wheels, although some harvesters provide power to the rear wheels as well. Much of the harvester's weight is supported by the powered non-steering front wheels, which resist turning. Thus, the rear steering wheels often can't sufficiently control the harvester trajectory. A harvester drive system may include various components for propulsion traction assistance such as an open locking differential, variable speed or variable displacement pumps and motors, and final drive gearboxes, but these components and the powered front non-steering wheels do not actively help steer the vehicle. A process called torque vectoring, in which a turning torque is applied to the harvester via the front wheels, may be used to assist the harvester in turning. However, this process requires speeding up or slowing down one of the front wheels, which in turn speeds up or slows down the harvester when turning. Other agricultural vehicles experience these same problems.

SUMMARY

The present invention solves the above-described problems and provides a distinct advance in the art of drive systems for harvesters and other agricultural vehicles. More particularly, the present invention provides a drive system for an agricultural vehicle and a computer program and method of controlling the drive system for improving steering of the agricultural vehicle.

A drive system constructed in accordance with an embodiment of the invention broadly comprises a variable displacement pump, two or more variable displacement motors, and an electronic module. The pump and the motors power the front wheels of the agricultural vehicle. The electronic module is provided for instructing the motors to apply a turning torque on the agricultural vehicle via the front wheels. The electronic module also reduces an output of the pump for maintaining a speed of the agricultural vehicle while turning.

Another embodiment of the invention is a computer program and method for controlling a drive system of a harvester or other agricultural vehicle. The computer program broadly comprises reducing an output of an inner motor of the drive system and reducing a pump output of a pump of the drive system. By reducing the pump output in addition to the inner motor output, the speed of the agricultural vehicle is maintained while turning.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Figure 2:
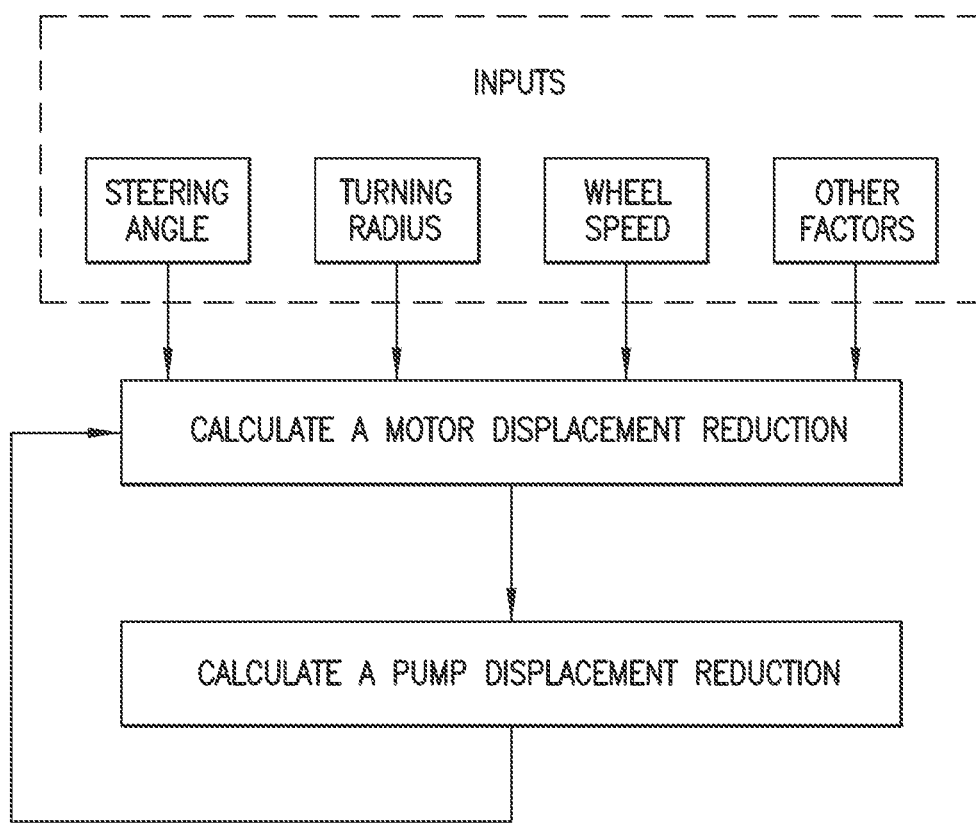

Embodiments of the present invention are described in detail below with reference to the attached drawing figures, wherein:

FIG. 1 is a plan view of a drive system of an agricultural vehicle constructed in accordance with an embodiment of the invention; and FIG. 2 is a flow chart of a method of controlling the drive system of FIG. 1.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, and particularly FIG. 1, an agricultural vehicle 10 with a drive system 12 is illustrated. The agricultural vehicle 10 may be a harvester or any other vehicle with left and right front non-steering wheels 14, 16 and left and right rear steering wheels 18, 20. The drive system 12 broadly includes a variable displacement pump 22, left and right front variable displacement motors 24, 26 and left and right rear variable displacement motors 28, 30 driven by the variable displacement pump 22, and an electronic module 32 communicatively connected to the variable displacement pump 22 and the variable displacement motors 24, 26, 28, 30.

The front non-steering wheels 14, 16 are connected to the front variable displacement motors 24, 26 either directly or via final drive gearboxes or other transmission components. The front non-steering wheels 14, 16 are spaced from each other by a known tread width, which may be used in the algorithm described below.

The rear steering wheels 18, 20 are connected to the rear variable displacement motors 28, 30 either directly or via final drive gearboxes or other transmission components. The rear steering wheels 18, 20 are spaced from each other by a known tread width and are spaced from the front wheels 14, 16 by a known wheelbase, which may be used in the algorithm described below.

The variable displacement pump 22 is drivably connected to the vehicle's engine 34 and is drivably connected to the variable displacement motors 24, 26, 28, 30 via hydraulic lines 36. The variable displacement pump 22 is configured to force a predetermined amount of hydraulic fluid per second (i.e., pump displacement) to the variable displacement motors 24, 26, 28, 30. The pump displacement may be increased or decreased to maintain a speed of the agricultural vehicle 10 during turning, as described below.

The left and right front variable displacement motors 24, 26 are connected in parallel to the variable displacement pump 22 and are drivably connected to the front non-steering wheels 14, 16. The variable displacement motors 24, 26 are configured to convert hydraulic pressure from the variable displacement pump 22 into rotational torque exerted on the front non-steering wheels 14, 16 by a predetermined amount of hydraulic fluid per second (i.e., motor displacement). Each motor displacement of the front variable displacement motors 24, 26 may be increased or decreased to provide a turning torque on the agricultural vehicle 10 for assisting the agricultural vehicle 10 in turning, as described below.

The left and right rear variable displacement motors 28, 30 are connected in parallel to the variable displacement pump 22 and are drivably connected to the left and right rear steering wheels 18, 20 either directly or via final drive gearboxes. Each motor displacement of the rear variable displacement motors 28, 30 may be increased or decreased to provide an additional turning torque on the agricultural vehicle 10 during turning, as described below.

The electronic module 32 is communicatively connected to the variable displacement pump 22 and to the variable displacement motors 24, 26, 28, 30. The electronic module 32 may also be communicatively connected to a steering angle sensor 38, a guidance system 40, wheel speed sensors 42, 44, and a rotational sensor 46 for receiving positional and motion data of the agricultural vehicle 10 therefrom.

The steering angle sensor 38 is a potentiometer or other device that senses a steering angle of the rear steering wheels 18, 20. The guidance system 40 may be a Global Navigational Satellite System (GNSS) receiver or a local guidance system on the agricultural vehicle 10 that calculates and transmits a signal representative of data such as a vehicle speed or a direction of travel of the agricultural vehicle 10 to the electronic module 32. The wheel speed sensors 42, 44 may be magnetic or mechanical tachometers that sense wheel speeds of the front wheels 14, 16 or the rear wheels 18, 20. The rotational sensor 46 may be an electronic, magnetic, or mechanical sensor that senses a travel heading of the agricultural vehicle 10. The data received from these devices are used in the algorithm described below.

The electronic module 32 may comprise or may be in communication with computing devices, servers, databases, and communication networks for executing the computer program and for performing the algorithm described herein. The electronic module 32 may comprise any number and combination of processors, controllers, integrated circuits, programmable logic devices, data and signal processing devices, one or more memory storage devices, transmitters, receivers, and/or communication busses for communicating with the various devices of the system. In various embodiments of the invention, the electronic module 32 may comprise a memory element, a communication component, a display, and/or a user interface.

The electronic module 32 may implement the computer program and/or code segments of the computer program to perform some of the functions and to carry out steps of the method for controlling the drive system 10, as described herein and as shown in FIG. 2. The computer program may comprise a listing of executable instructions or steps for implementing logical functions in the electronic module 32. It will be understood that the order in which the steps and code segments are carried out may vary or may be carried out substantially at the same time. The computer program can be embodied in any non-transitory computer readable medium for use by or in connection with an instruction execution system, apparatus, or device, and execute the instructions. In the context of this application, a "non-transitory computer readable medium" can be any means that can contain, store, communicate, propagate, or transport the program for use by or in connection with the instruction execution system, apparatus, or device. The non-transitory computer readable medium can be, for example, but not limited to, an electronic, magnetic, optical, electro magnetic, infrared, or semi conductor system, apparatus, device or propagation medium. More specific, although not inclusive, examples of the computer readable medium would include the following: a portable computer diskette, a random access memory (RAM), a read only memory (ROM), an erasable, programmable, read only memory (EPROM or flash memory), and a portable compact disk read only memory (CDROM), and combinations thereof. The various actions and calculations described herein as being performed by or using the computer program may actually be performed by one or more computers, processors, or other computational devices, including the electronic module 32 described herein, independently or cooperatively executing portions of the computer program.

The computer program for controlling the drive system 10 for providing turning assistance to the agricultural vehicle 10 is now described. For purposes of discussion, when the turning maneuver is a left turn, the left front wheel 14 and the left front motor 24 are the inner wheel and the inner motor, respectively, and the right front wheel 16 and the right front motor 26 are the outer wheel and the outer motor, respectively. The computer program reduces an inner motor displacement of the inner motor 24 by a calculated amount (a process called "torque vectoring") and reduces a pump displacement of the variable displacement pump 22 by a calculated amount for maintaining a speed of the harvester while turning.

The motor displacements of the front motors 24, 26 are equal when the agricultural vehicle 10 is travelling in a straight line. When the agricultural vehicle 10 makes a turning maneuver, the computer program reduces the inner motor displacement of the inner motor 24, thus creating a difference between the inner and the outer motor displacement. This difference is known as a torque vector. The torque vector produces a moment (i.e., a turning torque) around a vertical axis located at a midpoint between the inner and outer wheels 14, 16. This resulting moment helps place the agricultural vehicle 10 on the curved trajectory. The computer program may increase or decrease motor displacements of the rear variable displacement motors 28, 30 for generating additional turning torque, if applicable.

In conventional vehicles, a motor displacement reduction of the inner motor 24 causes more hydraulic fluid in the hydraulic lines 36 to be pumped to the outer motor 26 (i.e., an outer motor displacement increase). This increase speeds up the outer wheel 16, which speeds up the agricultural vehicle 10. To counter this effect, the computer program reduces the pump displacement of the variable displacement pump 22 to maintain a constant or slightly lower vehicle speed while turning.

The computer program may use various formulas, parameters, values, and algorithms to calculate the inner motor displacement reduction, "$\Delta Dm_{inner}$", and the pump displacement reduction, "$\Delta Dp$", as described herein:

The inner motor displacement reduction $\Delta Dm_{inner}$ is a function of a turning radius of the agricultural vehicle 10 and other variables such as vehicle speed, vehicle weight, terrain slope, and terrain surface conditions (e.g., mud, gravel, dry dirt). A theoretical turning radius $R_{th}$ can be approximated using the wheelbase, which is a known constant value, the rear wheel tread width, which is a known constant value but which varies with rear wheel width adjustment, and a rear wheel steering angle $\alpha$. Because the wheelbase and the rear wheel tread width are known, $R_{th}$ is a function of $\alpha$:

$$R_{th} = f(\alpha).$$

Other pump and motor parameters that are needed for calculating $\Delta Dm_{inner}$ and $\Delta Dp$ include the following:

$Dm_{straight}$=motor displacement while driving in a straight line.

$Dm_{inner}$=inner motor displacement when turning.

$Dm_{straight} - Dm_{inner} = \Delta Dm_{inner}$ (displacement reduction of inner motor when turning).

$Dp_{straight}$=pump displacement while driving in a straight line.

$Dp_{steering}$=pump displacement when turning.

$Dp_{straight} - Dp_{steering} = \Delta Dp$ (displacement reduction of pump when turning).

$Sp$=pump speed.

$Sm_{inner}$=inner motor speed.

A possible formula for calculating $Dm_{inner}$ from the above parameters is as follows:

$$\frac{Dm_{inner}}{Dm_{straight}} = 1 - \frac{x}{R_{th}} \text{ with } 0 \leq x \leq R_{th}.$$

Or, stated differently:

$$\Delta Dm_{inner} = \frac{x}{R_{th}} \times Dm_{straight}.$$

The parameter x could be either a constant value or a function of other parameters such as vehicle travel speed. The greater the value of x, the greater the inner motor displacement reduction and the lower the torque at the inner front wheel 14.

The pump displacement is reduced when reducing the inner front motor displacement to maintain a vehicle travel speed during the turn, as mentioned above. Thus, the pump flow is reduced at least as much as the inner front motor displacement reduction, which gives:

$$\Delta Dp \times Sp \geq \Delta Dm_{inner} \times Sm_{inner}.$$

$$\text{Restated, } \Delta Dp \geq \Delta Dm_{inner} \times \frac{Sm_{inner}}{Sp}.$$

$$\text{Thus, } \Delta Dp \geq \frac{x}{R_{th}} \times Dm_{straight} \times \frac{Sm_{inner}}{Sp}.$$

The travel heading as sensed by the rotational sensor 46 may be used to determine the actual turning radius of the vehicle $R_{actual}$. Excluding a few exceptions, it can be assumed that the actual turning radius $R_{actual}$ cannot be less than the theoretical turning radius $R_{th}$ because the agricultural vehicle 10 resists turning. On hard flat grounds, both turning radii should be very close to each other:

$$R_{actual} \approx R_{th}.$$

However, on muddy ground or while driving up or along a hill side, the difference between the theoretical and the actual turning radii can be significant:

$$R_{actual} \geq R_{th}.$$

A possible formula used to calculate $Dm_{inner}$ taking into account the actual turning radius is as follows:

$$\frac{Dm_{inner}}{Dm_{straight}} = 1 - \frac{x \times \left(\frac{R_{actual}}{R_{th}}\right)^{\frac{1}{n}}}{R_{th}}.$$

$$\text{With: } x \times \left(\frac{R_{actual}}{R_{th}}\right)^{\frac{1}{n}} \leq R_{th}.$$

$$\text{Such that: } \frac{Dm_{inner}}{Dm_{straight}} = 1 - \frac{x \times (R_{actual})^{\frac{1}{n}}}{R_{th}^{1+\frac{1}{n}}}.$$

Correction factor n is a positive integer greater than or equal to 1. The higher the value of n, the less influence the difference between $R_{actual}$ and $R_{th}$ has on the inner motor displacement reduction. In this case, the pump displacement reduction is calculated as follows:

$$\Delta Dp \geq \frac{x \times (R_{actual})^{\frac{1}{n}}}{R_{th}^{1+\frac{1}{n}}} \times Dm_{straight} \times \frac{Sm_{inner}}{Sp}.$$

Although the invention has been described with reference to the exemplary embodiments illustrated in the attached drawings, it is noted that equivalents may be employed and substitutions made herein without departing from the scope of the invention as recited in the claims.

Having thus described various embodiments of the invention, what is claimed as new and desired to be protected by Letters Patent includes the following:

1. A drive system for providing steering assistance to an agricultural vehicle including front non-steering wheels and rear steering wheels, the drive system comprising:

a variable displacement pump driven by an engine of the agricultural vehicle;

an inner and an outer variable displacement motor connected to the variable displacement pump and configured to provide torque to an inner and an outer wheel of the agricultural vehicle, respectively; and an electronic module for calculating an inner motor displacement reduction for applying a turning torque to the agricultural vehicle and for calculating a pump displacement reduction for maintaining a speed of the agricultural vehicle while the agricultural vehicle is turning.

2. The drive system of claim 1, wherein the pump displacement reduction is equal to the inner motor displacement reduction.

3. The drive system of claim 1, further comprising an inner rear and an outer rear variable displacement motor connected to the variable displacement pump and configured to provide torque to an inner rear steering wheel and an outer rear steering wheel of the agricultural vehicle, respectively, wherein the electronic module is configured to calculate a motor displacement reduction of the inner rear variable displacement motor for applying a turning torque to the agricultural vehicle.

4. The drive system of claim 1, wherein the inner motor displacement reduction is calculated as a function of a steering angle of the rear steering wheels of the agricultural vehicle, vehicle speed, vehicle weight, terrain slope, and a terrain surface condition.

5. The drive system of claim 1, further comprising a steering angle sensor configured to sense a steering angle of the rear steering wheels and to transmit a signal representative of the steering angle to the electronic module for calculating the inner motor displacement reduction.

6. The drive system of claim 1, wherein the electronic module is configured to receive from a Global Navigational Satellite System (GNSS) data corresponding to a vehicle speed and a direction of travel.

7. The drive system of claim 1, further comprising a plurality of wheel speed sensors each configured to sense a speed of one of the wheels and to transmit a signal representative of the speed to the electronic module for calculating the inner motor displacement reduction.

8. The drive system of claim 1, wherein the inner motor displacement reduction, $\Delta Dm_{inner}$, is calculated as follows:

$$\Delta Dm_{inner} = \frac{x}{R_{th}} \times Dm_{straight},$$

where $R_{th}$ is a theoretical turning radius, $Dm_{straight}$ is a motor displacement of the displacement motors when the agricultural vehicle is travelling in a straight line, and x is a function of vehicle travel speed.

9. The drive system of claim 1, wherein an inner motor displacement, $Dm_{inner}$, when the agricultural vehicle is turning is calculated as follows:

$$\frac{Dm_{inner}}{Dm_{straight}} = 1 - \frac{x \times (R_{actual})^{\frac{1}{n}}}{R_{th}^{1+\frac{1}{n}}},$$

where $R_{actual}$ is an actual turning radius of the agricultural vehicle, and n is a correction factor and is a positive integer greater than or equal to 1.

10. The drive system of claim 9, further comprising a rotational sensor configured to sense a travel heading of the agricultural vehicle.

11. The drive system of claim 10, wherein $R_{actual}$ is approximately equal to $R_{th}$.

12. The drive system of claim 1, wherein the pump displacement reduction, $\Delta Dp$, is calculated as follows:

$$\Delta Dp \geq \frac{x}{R_{th}} \times Dm_{straight} \times \frac{Sm_{inner}}{Sp},$$

where $Dm_{straight}$ is a motor displacement when the agricultural vehicle is travelling in a straight line, $Sm_{inner}$ is an inner motor speed when the agricultural vehicle is turning, and Sp is a pump speed.

13. The drive system of claim 1, wherein the pump displacement reduction, $\Delta Dp$, is calculated as follows:

$$\Delta Dp \geq \frac{x \times (R_{actual})^{\frac{1}{n}}}{R_{th}^{1+\frac{1}{n}}} \times Dm_{straight} \times \frac{Sm_{inner}}{Sp}.$$

* * * * *